(12) United States Patent
Schaefer

(10) Patent No.: US 8,777,298 B2
(45) Date of Patent: Jul. 15, 2014

(54) MOTOR VEHICLE WITH WATER CHAMBER

(71) Applicant: GM Global Technology Operations LLC, Detroit, MI (US)

(72) Inventor: Thilo Schaefer, Gross-Gerau (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/887,614

(22) Filed: May 6, 2013

(65) Prior Publication Data

US 2013/0300154 A1    Nov. 14, 2013

(30) Foreign Application Priority Data

May 8, 2012   (DE) .......................... 10 2012 008 934

(51) Int. Cl.
*B60J 1/00*    (2006.01)
*B62D 25/08*    (2006.01)

(52) U.S. Cl.
CPC .................................. *B62D 25/081* (2013.01)
USPC ....................................................... 296/192

(58) Field of Classification Search
CPC .......... B60J 1/00; B60J 1/002; B62D 28/081; B60S 1/50; B60S 1/448
USPC ................................ 296/192, 84.1, 90, 96.15
See application file for complete search history.

(56) References Cited

U.S. PATENT DOCUMENTS

| 5,509,606 | A | * | 4/1996 | Breithaupt et al. ........... 239/130 |
| 6,722,731 | B2 | | 4/2004 | Cornils et al. |
| 7,775,224 | B2 | * | 8/2010 | Franco et al. ................. 134/198 |

FOREIGN PATENT DOCUMENTS

| DE | 4303663 C1 | 3/1994 |
| DE | 19756983 C1 | 11/1998 |
| DE | 10351641 B3 | 2/2005 |

OTHER PUBLICATIONS

German Patent Office, German Search Report for Application No. 102012008934.1, dated Dec. 10, 2012.

* cited by examiner

*Primary Examiner* — Lori Lyjak
(74) *Attorney, Agent, or Firm* — Ingrassia Fisher & Lorenz, P.C.

(57) ABSTRACT

A motor vehicle having a windshield and a water chamber extending at the base of the windshield and having a joint. The water chamber is surrounded on at least a portion of its length on the underside by a channel that is at least superficially impermeable to water.

14 Claims, 2 Drawing Sheets

MOTOR VEHICLE WITH WATER CHAMBER

CROSS-REFERENCE TO RELATED APPLICATION

This disclosure claims priority to German Patent Application No. 10 2012 008 934.1, filed May 8, 2012, which is incorporated herein by reference in its entirety.

TECHNICAL FIELD

The technical field relates to a motor vehicle with a water chamber, and in particular the protection from an uncontrolled leakage of water from the water chamber into the engine compartment.

BACKGROUND

DE 43 03 663 C1 discloses a motor vehicle with a water chamber which is arranged between the base of a windshield, the upper edge of an end wall separating the engine compartment and the passenger compartment from one another, and the rear rim of an engine hood, in order to collect rainwater running off from the windshield and directing it into the open in a controlled manner via a discharge nozzle on the floor of the water chamber. When the water cannot run off quickly enough out from the water chamber, it accumulates therein and finally escapes on a different path than via the discharge nozzle. Since, in the known water chamber, a joint between a lower part and a cover of the water chamber lies higher than an air passage opening, via which air which is drawn in through the water chamber reaches the passenger compartment, the possibility exists here primarily that the accumulated water arrives into the passenger compartment together with the fresh air which is drawn in via the duct. In other constructions of water chambers, water can leak via an insufficiently tight joint, e.g., between the lower part and the cover of the water chamber or on a feedthrough.

When, on this path, the water comes in contact with moisture-sensitive, in particular electrical or electronic, components in the engine compartment, or when the water can be distributed in this way in an insulating layer delimiting the engine compartment, the result can be damage to the vehicle. As long as the leaking quantities of water are not too great and no water arrives into the passenger compartment, where it can not be overlooked, there is a high probability that a leakiness of the water chamber is only detected through the consequential damage which it causes.

It is therefore at least one object herein to provide a motor vehicle in which the risk of damage through a leakiness of the water chamber is at least reduced. In addition, other objects, desirable features and characteristics will become apparent from the subsequent summary and detailed description, and the appended claims, taken in conjunction with the accompanying drawings and this background.

SUMMARY

In accordance with an exemplary embodiment, in a motor vehicle, a water chamber extending at the base of a windshield and having at least one joint is provided. The water chamber is surrounded at least on a portion of its length on the underside by a channel which is at least superficially impermeable to water. This can collect water leaking from the water chamber via a leakiness of the joint and can convey it away on a path on which it cannot do any damage.

In an embodiment, the channel is formed from a sheet of insulating material so that it can serve not only for conveying water away, but also for protection from sound emission from the engine compartment. Such a channel can expediently adjoin a layer of insulating material which is mounted in a manner known per se on an end wall extending between the passenger compartment and the engine compartment, in order to insulate the passenger compartment against noises of the engine.

Alternatively, or additionally, the channel adjoins a layer of insulating material mounted beneath an engine hood, in order to damp operating noises of the engine not only with respect to the passenger compartment, but also with respect to the environment. Here, the channel can make an important contribution by bridging an intermediate space between the end wall and the layer of insulating material of the engine hood.

In order to ensure that the sheet of insulating material does not itself receive water leaking from the water chamber, in an embodiment it carries a watertight film on a side facing the water chamber.

In order to act in a sound-damping manner, the channel, or a sheet of insulating material from which it is formed, comprises a layer of non-woven material or foam, in an exemplary embodiment.

The shaping of the channel is particularly simple when the layer of non-woven material or foam has a thermoplastic material.

The channel can expediently have an elongated zone, in which it is locally compacted. In such a compacted zone, the bending resistance is reduced, so that the channel can be shaped easily and reproducibly by bending along the zone.

Such a locally compacted zone is particularly simple to produce by the action of pressure and heat, when the layer of non-woven material or foam of the channel, as mentioned above, has a thermoplastic material which is meltable under the action of heat and pressure or is at least permanently deformable.

In an embodiment, a fold formed on the bottom of the channel is predestined to collect therein any water that has leaked from the water chamber. In order to convey this water away in a targeted manner on a path where it cannot cause any damage, a projection can be formed on a rim of the channel, which projection functions as a drip nozzle and from which a fold of the channel originates.

In an embodiment, this fold runs in an ascending manner from the projection when the vehicle is standing on a level surface, in order to collect water which drips into the channel and to direct it to a drip edge or -nozzle.

An elongated structure of the channel, running downwards to the fold, can promote the convergence of the water in the channel. Such a structure can be formed, like the fold itself, by local compacting of the material of the channel.

In an embodiment, the channel is fixed on the water chamber by at least one insert piece which penetrates at least one hole of the channel.

In particular, the water chamber can have a projecting lug, on which the channel is fixed by an insert piece, which penetrates holes of the channel and of the lug.

In an embodiment, the water chamber comprises two shell parts, such as for instance a lower part and a cover. When these, respectively, have a lug, the insert piece can serve not only for the fixing of the channel, but also for the fixing of the shell parts of the water chamber to one another.

In addition, the channel can have several regions which are delimited from one another by folds, of which at least two regions have holes. By these holes being penetrated, lying one over another, by the insert piece, the two regions of the channel are fixed relatively to one another in a fixed angle.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
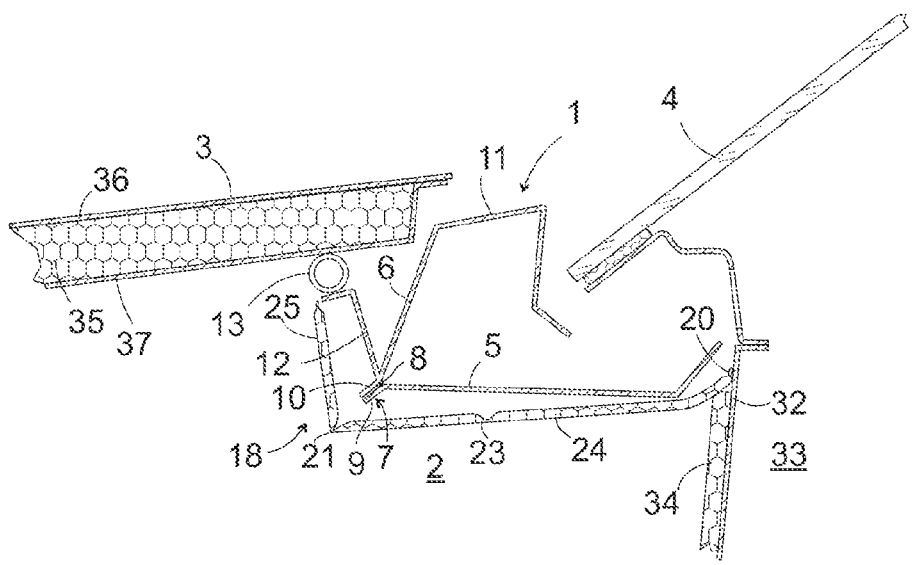
FIG. 1 is a cross-sectional view through a water chamber of a motor vehicle and its environment in longitudinal direction of the vehicle according to an exemplary embodiment.
Figure 4:
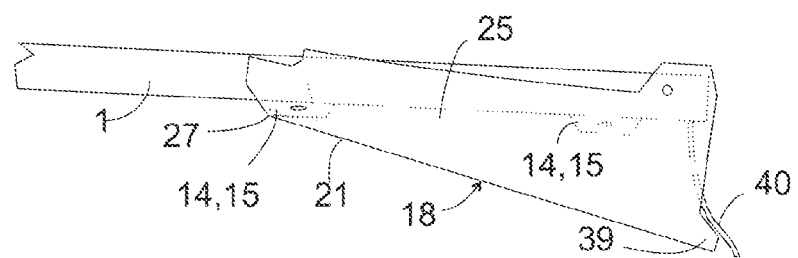
FIG. 4 is a front view of the water chamber with a channel fixed thereon.

FIG. 1 shows in cross-sectional view a water chamber 1, which is arranged in an engine compartment 2 of a motor vehicle under the rearward rim of an engine hood 3 and the lower edge of a windshield 4. The water chamber 1 extends transversely to the section direction of FIG. 1 over substantially the entire width of the engine compartment 2 and the windshield 4, in order to collect rainwater running off from the windshield 4 and directing it into the open via discharge tubes 40 (illustrated in FIG. 4). The water chamber can have a flat rafter shape in front view, with two sloping sections from the centre towards the sides of the vehicle and respectively discharge tubes 40 connected at a locally lowest point at the lateral ends of the water chamber. Such a section with discharge tube 40 is shown in the illustration of FIG. 4. Alternatively, the water chamber can also be V-shaped, with a centrally arranged discharge tube, or M-shaped with three discharge tubes.

The water chamber 1 is joined together here from two parts which extend in the transverse direction of the vehicle over its entire length, a shell part 5 and a cover part 6. Both parts, 5, 6 are formed from plastic, by injection molding or, for example, by deep-drawing. The shell part 5 has substantially the shape of a flat, upwardly open channel, which is not closed by the cover part 6 on its entire width, so that rainwater dripping on the lower edge of the windshield 4 can arrive into the shell part 5. The cover part 6 carries in an apex region 11, engaging into an intermediate space between the engine hood 3 and the windshield 4, spray nozzles—not illustrated in the figure—of a windshield wiper system, and also the shafts of windshield wipers extend through the cover part 6. On a front side of the cover part 6 facing the engine compartment 2 a web 12 is formed, which carries a seal 13, here of tubular cross-section. When the engine hood 3 is situated in closed position, the seal 13 is elastically compressed in contact with the engine hood 3.

A joint 7, at which the shell- and cover parts 5, 6 are connected with one another, extends over the entire length of the water chamber 1 and comprises two webs 9, 10 formed onto the shell part 5 or respectively the cover part 6, and a seal 8 clamped between the webs 9, 10. As becomes clear in the section of FIG. 3, the webs 9, 10 are widened in parts to lugs 14, 15, in the openings 16 of which, which overlap with one another, a detent clip 17 is inserted, in order to fix the lugs 14, 15 to one another and to produce the necessary pressure for the clamping of the seal 8.

When the seal 8 becomes brittle in the course of time, when the shell- and cover parts 5, 6 have to be temporarily detached from one another for maintenance or repair purposes, or through the action of frost the seal 8 can become leaky, with the result that rainwater collected in the shell part 5 penetrates into the intermediate space between webs 9, 10, and, when the accommodating capacity of the intermediate space is exhausted, it drips out from the intermediate space. Drop formation occurs here primarily at locally lowest points of the intermediate space. As becomes clear from the front view of the water chamber 1 in FIG. 4, such locally lowest points are situated here at the lugs 14, 15. The same problem can occur at other joints of the water chamber 1, such as for instance lead-throughs at which e.g. a windshield wiper shaft or a supply line of the spray nozzles mounted on the cover part 6 is to be inserted in a watertight manner into the wall of the water chamber 1. When such joints become leaky and water is distributed from them in the engine compartment 2, parts of the engine electrics or other sensitive fixtures of the engine compartment 2 can become wet and be damaged. This is particularly treacherous because such a leakage is generally only discovered by the user of the vehicle from the consequently damage which it has caused.

In order to prevent the risk of an unnoticed penetration of water into the engine compartment 2, according to an embodiment a channel 18 is mounted beneath at least the regions of the water chamber 1 where the risk of the dripping of water in the case of a leakage is particularly high. In the present case, these are the lugs 14, 15, at which the shell- and cover parts 5, 6 are held together. The front view of FIG. 4 shows such a channel 18, which surrounds two pairs of lugs 14, 15 on a right-hand half of the water chamber 1. A second such channel is mounted in mirror image hereto at the pairs of lugs of the left-hand half of the water chamber 1 which is not illustrated. Alternatively hereto, a single channel 18 could also be provided, extending over the entire length of the water chamber 1.

Figure 2:
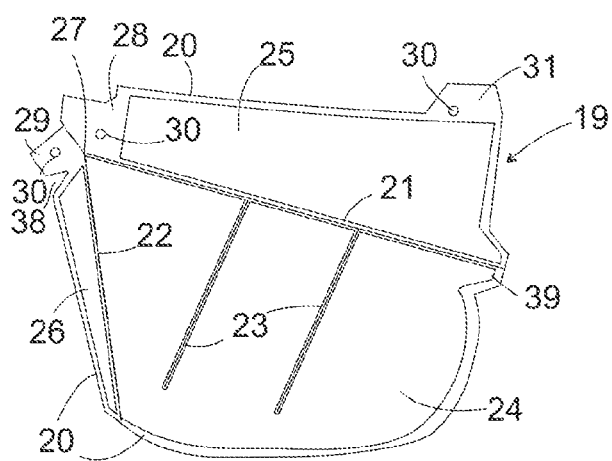
FIG. 2 is a top view onto a sheet of insulating material used for forming a channel extending under the water chamber of FIG. 1.

In an embodiment, the channel 18 is formed from a sheet of insulating material 19, which is shown in a top view in FIG. 2. The sheet 19 is cut from a web of material, which is composed of a layer of non-woven absorber several millimeters thick and of a watertight plastic film, with which the layer of non-woven absorber is covered on at least one side. On the second side of the layer of non-woven absorber, a thin covering layer of a water-repellent non-woven material can be provided, which is relatively tight compared with the layer of non-woven absorber. The fibers of the layer of non-woven absorber consist of a thermoplastic plastic, such as polyester. Simultaneously with the punching out of the sheet 19 from the web of material, the sheet 19 is compressed at its rims 20 and along several lines 21, 22, 23 under the action of heat. By the fibers of the layer of non-woven absorber fusing with one another or at least adhering to one another here, a fraying of the sheet of insulating material 19 along its rims 20 is prevented; in addition, the lines 21, 22, 23 which are thus processed form depressions in the surface of the sheet of insulating material 19, along which the layer of non-woven absorber is locally compacted and along which the sheet 19, at least in the case of the lines 21, 22 continuing from one rim 20 to the other, is more easily flexible than in the non-compacted regions 24 to 26 which are delimited from one another by the lines 21, 22.

Figure 3:
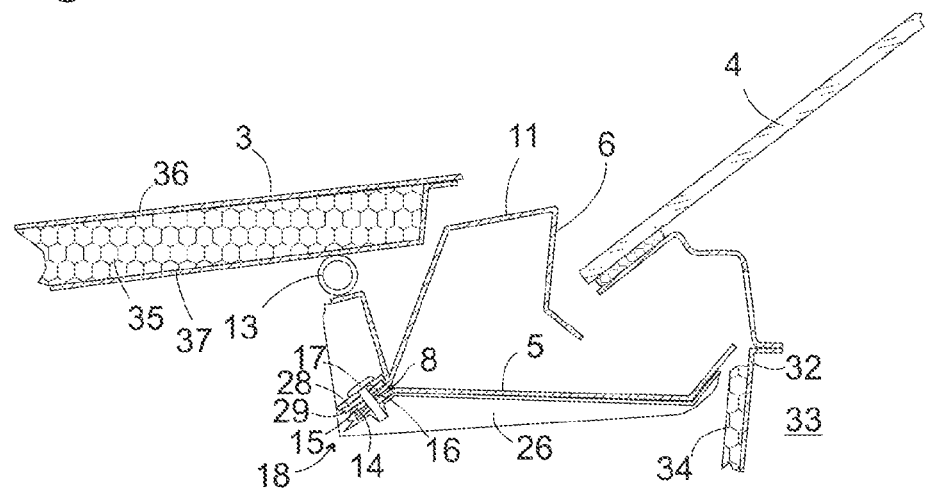
FIG. 3 is a cross-sectional view analogous to FIG. 1 along a section plane set into transverse direction of the vehicle according to an exemplary embodiment.

In another embodiment, adjacent to a point 27 at which the lines 21, 22 meet one another, the compacted rims 20 of the regions 25, 26 are widened to two lugs 28, 29, into which respectively an opening 30 is punched. At the rim of the region 25 in addition a second lug 31 with opening 30 is formed. By the sheet 19 being bent along the lines 21, 22, the lugs 28, 29 can be laid one over the other so that their openings 30 overlap. By means of the detent clip 17, these lugs 28, 29, are shown in FIG. 3, are fixed securely on a pair of lugs 14, 15 of the water chamber 1. Thereby, the sheet of insulating material 19 is fixed on the one hand in a configuration folded along the line 21 to the channel 18, and on the other hand is held on the water chamber 1 so that the region 24 extends substantially, as can be seen in particular in FIG. 1, at a small distance below the shell part 5 up to an end wall 32, which separates the engine compartment 2 from a passenger area 33 of the vehicle. The region 24 adjoins here a sheet of insulating material 34 which is fastened on the engine compartment side to the end wall 32. The region 24 is slightly sloping towards the line 21, so that water which, irrespective of which way, arrives from the water chamber 1 to the region 24, flows off on the latter towards the line 21. The lines 23 also contribute to this, which branching off from the line 21 extend in the manner of drainage channels over the region 24 and feed water collected in them into the channel formed by the line 21.

A region 25 extends in front of the cover part 6 approximately into the height of the seal 13. A further sheet of insulating material 35 is mounted on the engine hood 3, inserted here between an outer plate 36 of the hood and a substructure 37 reinforcing the outer plate 36. The channel 18 and the seal 13 form an uninterrupted connection between the sheets of insulating material 34, 35, the end wall 32 and the hood 3 and thus prevent intensive engine noise from penetrating into the open between the hood 3 and the windshield 4.

In turn in relation to FIG. 2 a recess 38 is formed at the rim of the sheet of insulating material 19 adjacent to the lug 29. The webs 9, 10 engage into this recess 38 when the sheet of insulating material is formed into the channel 18 and is mounted on the water chamber 1, so that the region 26 extending on the other side of the recess 38, as shown in FIG. 3, can fit tightly from below onto the shell part 5.

In turn in relation to FIG. 4, it can be seen that the folded line 21 runs from the point 27 downwards up to a projection 39, which is situated approximately beneath the lateral end of the water chamber 1. Water collected by the channel 18 flows downwards along the line 21, in order to finally drip off at the projection 39. The latter is situated in the immediate vicinity of a side wall of the engine compartment, for example a wheel arch. The water can be guided downwards and into the open at this side wall safely past sensitive components of the engine compartment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A motor vehicle comprising:
   a windshield; and
   a water chamber extending at a base of the windshield and having at least one joint; and
   a channel that surrounds at least a portion of an underside of the water chamber and that is at least superficially impermeable to water, and
   wherein a projection is formed on a rim of the channel and a fold of the channel originates from the projection.

2. The motor vehicle according to claim 1, wherein the channel is formed from a sheet of insulating material.

3. The motor vehicle according to claim 2, wherein the channel adjoins a layer of insulating material that is mounted on an end wall extending between the passenger compartment and the engine compartment.

4. The motor vehicle according to claim 2, wherein the channel adjoins a layer of insulating material mounted on an engine hood.

5. The motor vehicle according to claim 2, wherein the sheet of insulating material carries a watertight foil on a side facing the water chamber.

6. The motor vehicle according to claim 1, wherein the channel comprises a layer of non-woven material or foam.

7. The motor vehicle according to claim 6, wherein the layer of non-woven material or foam has a thermoplastic material.

8. The motor vehicle according to claim 1, wherein the channel has an elongated zone which is locally compacted.

9. The motor vehicle according to claim 8, wherein a fold is formed along the elongated zone in the channel.

10. The motor vehicle according to claim 1, wherein the channel has an elongated structure running downwards to the fold.

11. The motor vehicle according to claim 1, wherein the channel is fixed on the water chamber by an insert piece that penetrates a hole of the channel.

12. The motor vehicle according to claim 1, wherein the water chamber has a projecting lug, and wherein the channel is fixed on the lug by an insert piece penetrating holes of the channel and of the lug.

13. The motor vehicle according to claim 12, wherein the water chamber comprises two parts that respectively have a lug and are fixed to one another by the insert piece.

14. The motor vehicle according to claim 12, wherein the channel comprises several regions delimited from one another by folds and that two of these regions have holes lying one over another and penetrated by the insert piece.

\* \* \* \* \*